(12) United States Patent
Li (10) Patent No.: US 9,154,309 B2
(45) Date of Patent: Oct. 6, 2015

(54) METHOD AND SYSTEM FOR RUNNING ENCRYPTED FILES

(71) Applicant: Tencent Technology (Shenzhen) Company Limited, Shenzhen (CN)

(72) Inventor: Danhua Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/040,537

(22) Filed: Sep. 27, 2013

(65) Prior Publication Data

US 2014/0195825 A1 Jul. 10, 2014

Related U.S. Application Data (63) Continuation of application No. PCT/CN2013/079589, filed on Jul. 18, 2013.

(30) Foreign Application Priority Data

Jul. 19, 2012 (CN) .......................... 2012 1 0251187

(51) Int. Cl.
*G06F 11/14* (2006.01)
*H04L 9/32* (2006.01)
*G06F 21/00* (2013.01)

(52) U.S. Cl.
CPC .............. *H04L 9/3268* (2013.01); *G06F 21/00* (2013.01)

(58) Field of Classification Search
CPC .............................................. G06F 2221/2107
USPC .......... 713/164–167, 182–186; 726/26–30, 2, 726/12–17; 380/277–286
See application file for complete search history.

(56) References Cited

U.S. PATENT DOCUMENTS

| 5,265,159 | A | * | 11/1993 | Kung ............................. 713/193 |
| 2004/0181668 | A1 | * | 9/2004 | Blew et al. .................... 713/165 |
| 2005/0278788 | A1 | * | 12/2005 | Jindal et al. ..................... 726/26 |
| 2005/0289655 | A1 | * | 12/2005 | Tidwell et al. .................. 726/27 |
| 2007/0083768 | A1 | * | 4/2007 | Isogai et al. .................... 713/189 |
| 2008/0214300 | A1 | * | 9/2008 | Williams et al. ................ 463/29 |
| 2009/0022324 | A1 | * | 1/2009 | Inokuchi et al. .............. 380/279 |
| 2009/0080650 | A1 | * | 3/2009 | Selgas et al. .................... 380/44 |
| 2009/0187981 | A1 | * | 7/2009 | Pan et al. .......................... 726/7 |
| 2011/0167498 | A1 | | 7/2011 | Wilson |

FOREIGN PATENT DOCUMENTS

| CN | 1952949 A | 4/2007 |
| CN | 101008974 A | 8/2007 |
| CN | 102118512 A | 7/2011 |
| CN | 102819702 A | 12/2012 |
| WO | WO 2007014790 A1 | 2/2007 |

OTHER PUBLICATIONS

Tencent Tech, ISRWO, PCT/CN2013/079589, Oct. 24, 2013, 13 pgs.
Tencent Tech, IPRP, PCT/CN2013/079589, Jan. 20, 2015, 11 pgs.

* cited by examiner

*Primary Examiner* — Josnel Jeudy
(74) *Attorney, Agent, or Firm* — Morgan, Lewis & Bockius LLP (57) ABSTRACT

A computer-implemented method for running an encrypted file and system are provided, where the method includes the following steps: receiving a file running instruction; invoking an encrypted target file according to the file running instruction, and performing memory-based decryption on the encrypted target file according to key information corresponding to the encrypted target file; and running the encrypted target file on which the memory-based decryption is performed.

19 Claims, 9 Drawing Sheets

METHOD AND SYSTEM FOR RUNNING ENCRYPTED FILES

RELATED APPLICATION

This application is a continuation application of PCT Patent Application No. PCT/CN2013/079589, entitled "METHOD AND SYSTEM FOR RUNNING ENCRYPTED FILES" filed on Jul. 18, 2013, which claims priority to Chinese Patent Application No. 201210251187.3, entitled "METHOD AND SYSTEM FOR RUNNING ENCRYPTED FILES," filed on Jul. 19, 2012, both of which are incorporated by reference in their entirety.

TECHNICAL FIELD

The disclosed implementations relate generally to the field of computer security technologies, and in particular, to a file encryption and running method and a file encryption and running system.

BACKGROUND

With the increasing development and widespread application of computers, mobile phones, and other terminal electronic devices, security problems have caught increasing attention, and one kind of security is reflected in security protection on specific files (including software and so on). For the protection on the specific files, a manner currently adopted is described as follows: these files are encrypted through encryption/decryption software and so on; when a file needs to be run or is run, after a password of the encryption/decryption software is input correctly, a user finds a directory where an encrypted file is located; inputs a correct password of the file that needs to be run or is run; decrypts the file; and runs the file after the decryption is completed, or runs a file or software on which memory-based decryption is performed. Based on this manner, when a file on which memory-based decryption is performed needs to be run or is run, it is required to manually input a password of the file that needs to be run, and the file is run after password authentication is correct and the file is decrypted, which severely affects the efficiency of running of the encrypted file.

SUMMARY

For the problem existing in the prior art, the present invention is directed to provide a file encryption and running method and an encryption and running system, which can improve the efficiency when an encrypted file is run.

In order to achieve the objectives, the present invention adopts the following technical solutions:

A computer-implemented method for running an encrypted file is provided, which includes the following steps: receiving a file running instruction; invoking an encrypted target file according to the file running instruction, and performing memory-based decryption on the encrypted target file according to key information corresponding to the encrypted target file; and running the encrypted target file on which the memory-based decryption is performed.

A computer system for running an encrypted file is provided, which includes: a running instruction receiving unit, configured to receive a file running instruction; and a file running unit, configured to invoke an encrypted target file according to the file running instruction, perform memory-based decryption on the encrypted target file according to key information corresponding to the encrypted target file, and run the encrypted target file on which the memory-based decryption is performed.

According to the solutions of the present invention, when it is required to run the encrypted target file, the key information corresponding to the encrypted target file is obtained, the memory-based decryption is performed on the encrypted target file in a memory by using the key information, and the encrypted target file is directly run after the memory-based decryption is completed. In this file running manner, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby improving the security of running the encrypted file.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

The following describes the solutions in the present invention in details in combination with exemplary embodiments. In the following illustration, embodiments of a file encryption and running method of the present invention are first illustrated, and then, embodiments of a file encryption and running system of the present invention are illustrated.

Embodiment 1

Figure 1:
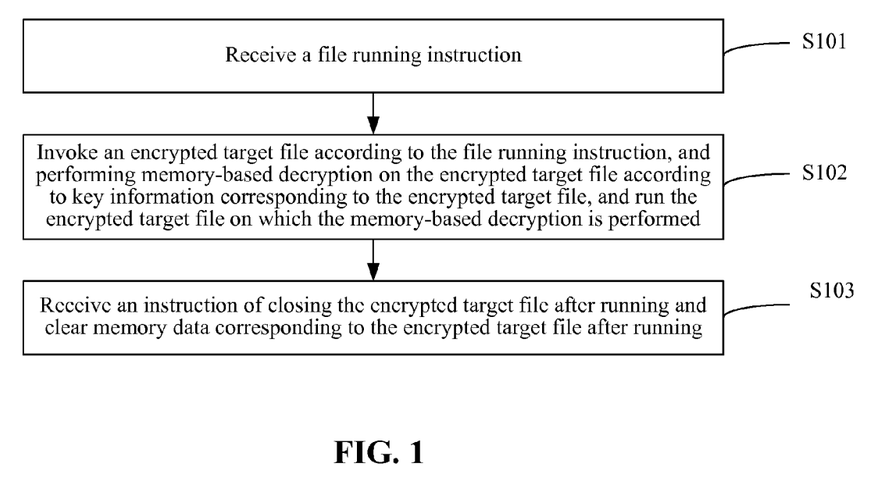
FIG. 1 is a schematic flowchart of Embodiment 1 of a file encryption and running method according to some embodiments of the present invention.

FIG. 1 shows a schematic flowchart of Embodiment 1 of a file encryption and running method according to some embodiments of the present invention. In this embodiment, a process of running an encrypted file is taken as an example for illustration.

As shown in FIG. 1, the file encryption and running method in Embodiment 1 includes the following steps:

Step S101: Receive a file running instruction.

Step S102: Invoke an encrypted target file according to the file running instruction, perform memory-based decryption on the encrypted target file according to key information corresponding to the encrypted target file, and run the encrypted target file on which the memory-based decryption is performed.

According to the solution in this embodiment, when it is required to run the encrypted target file, the key information corresponding to the encrypted target file is obtained, the memory-based decryption is performed on the encrypted target file in a memory by using the key information, and the encrypted target file is directly run after the memory-based decryption is completed. In this file running manner, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby improving the security of running the encrypted file.

As shown in FIG. 1, in this embodiment, the following step is optionally further included:

Step S103: Receive an instruction of closing the encrypted target file after running and clear memory data corresponding to the encrypted target file after running.

Therefore, the encrypted target file that is run before does not leave relevant data information in the memory after the running encrypted target file is closed, so that information data relevant to the encrypted target file cannot be easily obtained by people, which further ensures the security of the encrypted target file.

In some embodiments, when the memory data is cleared, various manners are adopted according to different actual application requirements. In one implementation, after the instruction of closing the encrypted target file after running is received, a prompt about whether to clear the memory data is given, and a user selects whether to perform clearing. When it is determined that the clearing needs to be performed, the memory data is cleared based on a clearing instruction given by the user through selecting a corresponding option or button. In another implementation, a prompt is not given, and the memory data is directly and automatically cleared after the instruction of closing the encrypted target file after running is received, so as to enhance the security.

In addition, when the instruction of closing the encrypted target file after running is received, encryption is, optionally, further performed by directly invoking the key information corresponding to the encrypted target file, so that the encrypted target file after running does not need to be manually encrypted, thereby further improving the efficiency of running the encrypted file.

Embodiment 2

Figure 2:
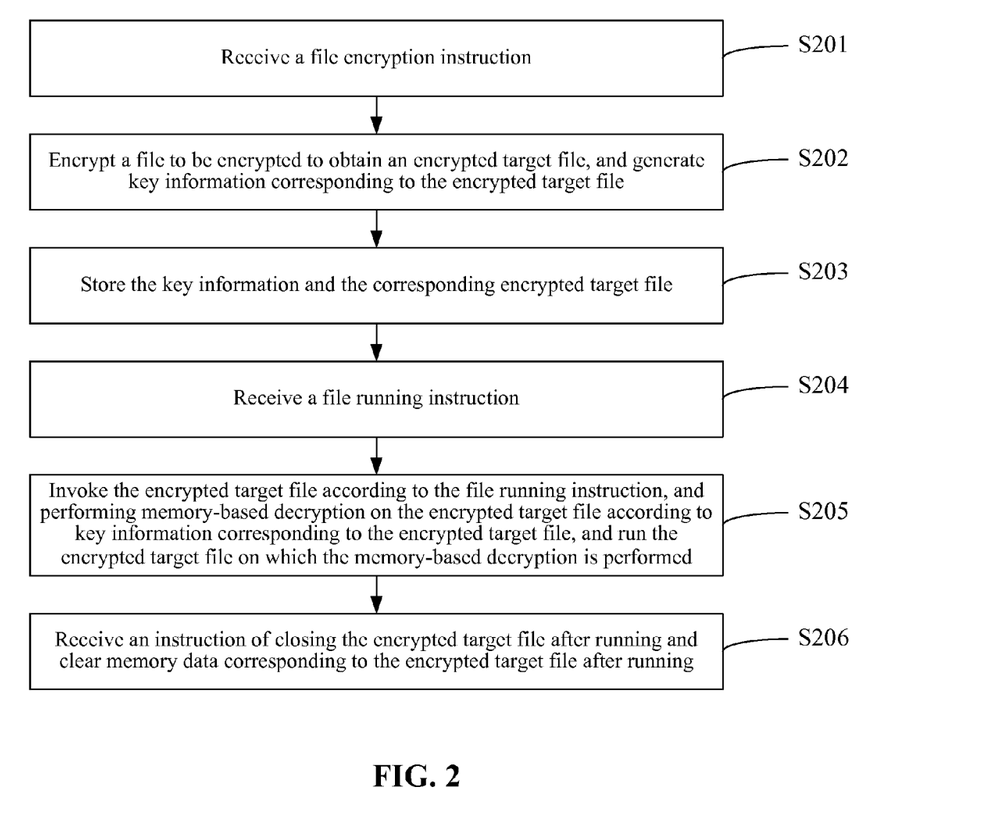
FIG. 2 is a schematic flowchart of Embodiment 2 of a file encryption and running method according to some embodiments of the present invention.

FIG. 2 shows a schematic flowchart of Embodiment 2 of a file encryption and running method according to some embodiments of the present invention. In this embodiment, the difference from the method in Embodiment 1 mainly lies in that the method in this embodiment is further described in combination with a file encryption process.

As shown in FIG. 2, the method in Embodiment 2 includes the following steps:

Step S201: Receive a file encryption instruction.

Step S202: Encrypt a file to be encrypted to obtain an encrypted target file, and generate key information corresponding to the encrypted target file.

Step S203: Store the key information and the corresponding encrypted target file.

Step S204: Receive a file running instruction.

Step S205: Invoke the encrypted target file according to the file running instruction, perform memory-based decryption on the encrypted target file according to the key information corresponding to the encrypted target file, and run the encrypted target file on which the memory-based decryption is performed.

According to the solution in this embodiment, when the file is encrypted, the key information corresponding to the encrypted target file is generated, and the key information and the encrypted target file are correspondingly stored, so that when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby further improving the security of running the encrypted file.

In some embodiments, when the key information and the encrypted target file are correspondingly stored, the key information and the encrypted target file are locally stored or stored in a remote server, or one of the key information and the encrypted target file is locally stored, and the other is stored in a remote server, and different settings are made according to different specific requirements. In another aspect, when the key information and the encrypted target file are locally stored or stored in the remote server, the key information and the encrypted target file are, optionally, combined into one file and stored, or the key information and the encrypted target file are stored as two separate files, so as to enhance the security, as long as a corresponding key relationship can be obtained based on the corresponding storage relationship to decrypt the encrypted target file, when the encrypted target file needs to be opened.

As shown in FIG. 2, in this embodiment, the following step is optionally further included:

Step S206: Receive an instruction of closing the encrypted target file after running and clear memory data corresponding to the encrypted target file after running.

Therefore, the encrypted target file that is run before does not leave relevant data information in the memory after the running encrypted target file is closed, so that information data relevant to the encrypted target file cannot be easily obtained by people, which further ensures the security of the encrypted target file.

In some embodiments, when the memory data is cleared, various manners are adopted according to different actual application requirements. In one implementation, after the instruction of closing the encrypted target file after running is received, a prompt about whether to clear the memory data is given, and a user selects whether to perform clearing. When it is determined that the clearing needs to be performed, the memory data is cleared based on a clearing instruction given by the user through selecting a corresponding option or button. In another implementation, prompt information is not given, and the memory data is directly and automatically cleared after the instruction of closing the encrypted target file after running is received, so as to enhance the security.

In addition, when the instruction of closing the encrypted target file after running is received, encryption is optionally further performed by directly invoking the key information corresponding to the encrypted target file, so that the encrypted target file after running does not need to be manually encrypted, thereby further improving the efficiency of running the encrypted file.

Embodiment 3

Figure 3:
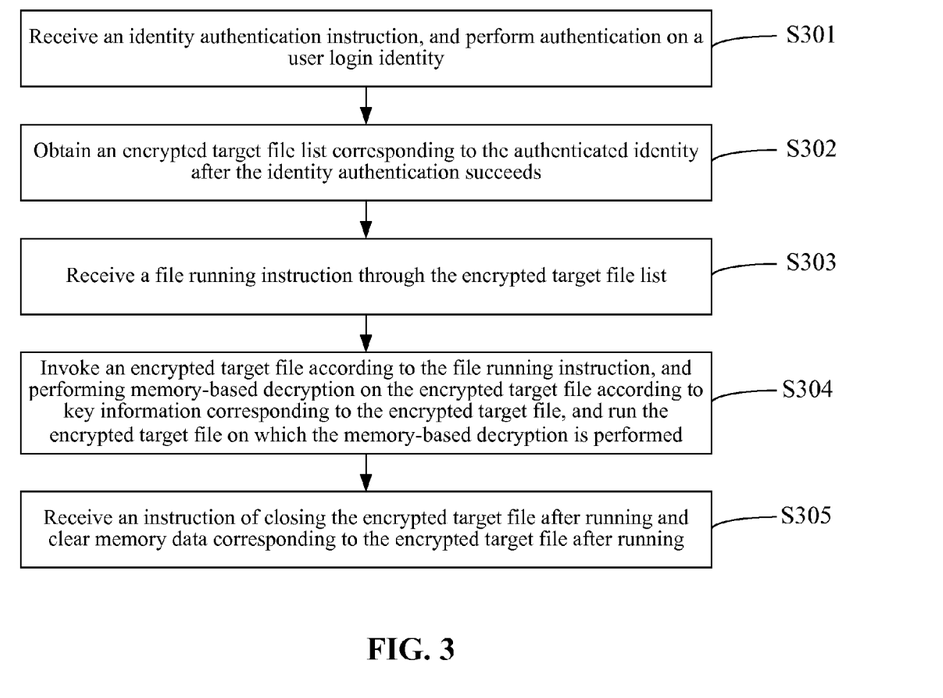
FIG. 3 is a schematic flowchart of Embodiment 3 of a file encryption and running method according to some embodiments of the present invention.

FIG. 3 shows a schematic flowchart of Embodiment 3 of a file encryption and running method according to some embodiments of the present invention. In this embodiment, the difference from Embodiment 1 mainly lies in that this embodiment is illustrated in combination with an identity authentication process.

As shown in FIG. 3, the file encryption and running method in Embodiment 3 includes the following steps:

Step S301: Receive an identity authentication instruction, and perform authentication on a user login identity.

Step S302: Obtain an encrypted target file list corresponding to the authenticated identity after the identity authentication succeeds.

Step S303: Receive a file running instruction through the encrypted target file list.

Step S304: Invoke an encrypted target file according to the file running instruction, perform memory-based decryption on the encrypted target file according to key information corresponding to the encrypted target file, and run the encrypted target file on which the memory-based decryption is performed.

According to the solution in Embodiment 3, after the user identity authentication succeeds, a user that currently logs in or a user that needs to run an encrypted target file in the encrypted target file list is trusted, so that when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby improving the security of running the encrypted file.

In some embodiments, when the user identity is authenticated, various possible manners are adopted, for example, the identity authentication is performed according to information such as a numeric password, a facial image, fingerprint information, or audio data of a user, and a specific identity authentication manner is not elaborated herein.

As shown in FIG. 3, in this embodiment, the following step is optionally further included:

Step S305: Receive an instruction of closing the encrypted target file after running and clear memory data corresponding to the encrypted target file after running.

Therefore, the encrypted target file that is run before does not leave relevant data information in the memory after the running encrypted target file is closed, so that information data relevant to the encrypted target file cannot be easily obtained by people, which further ensures the security of the encrypted target file.

In some embodiments, when the memory data is cleared, various manners are adopted according to different actual application requirements. In one implementation, after the instruction of closing the encrypted target file after running is received, a prompt about whether to clear the memory data is given, and a user selects whether to perform clearing. When it is determined that the clearing needs to be performed, the memory data is cleared based on a clearing instruction given by the user through selecting a corresponding option or button. In another implementation, prompt information is not given, and the memory data is directly and automatically cleared after the instruction of closing the encrypted target file after running is received, so as to enhance the security.

In addition, when the instruction of closing the encrypted target file after running is received, encryption is optionally further performed by directly invoking the key information corresponding to the encrypted target file, so that the encrypted target file after running does not need to be manually encrypted, thereby further improving the efficiency of running the encrypted file.

Embodiment 4

Figure 4:
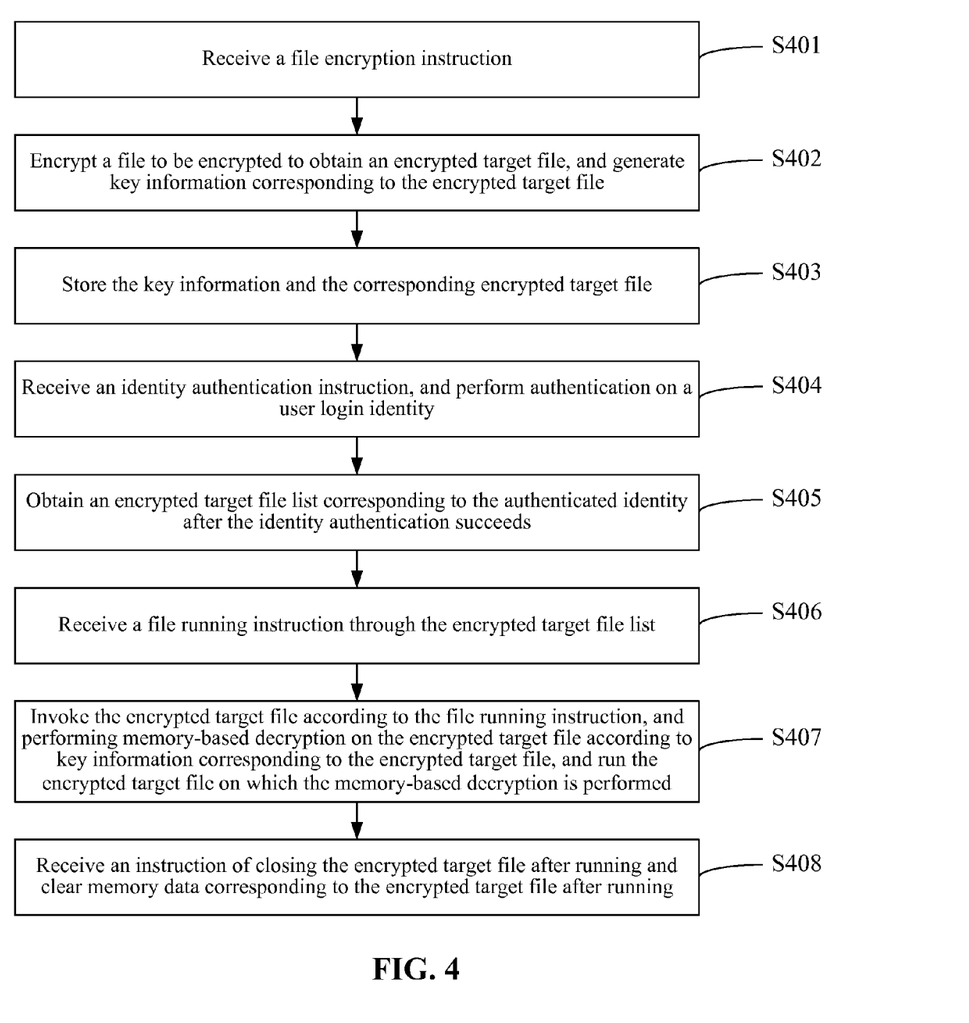
FIG. 4 is a schematic flowchart of Embodiment 4 of a file encryption and running method according to some embodiments of the present invention.

FIG. 4 shows a schematic flowchart of Embodiment 4 of a file encryption and running method according to some embodiments of the present invention. In this embodiment, the difference from Embodiment 2 mainly lies in that this embodiment is illustrated in combination with an identity authentication process.

As shown in FIG. 4, the file encryption and running method in Embodiment 4 includes the following steps:

Step S401: Receive a file encryption instruction.

Step S402: Encrypt a file to be encrypted to obtain an encrypted target file, and generate key information corresponding to the encrypted target file.

Step S403: Store the key information and the corresponding encrypted target file.

Step S404: Receive an identity authentication instruction, and perform authentication on a user login identity.

Step S405: Obtain an encrypted target file list corresponding to the authenticated identity after the identity authentication succeeds.

Step S406: Receive a file running instruction through the encrypted target file list.

Step S407: Invoke the encrypted target file according to the file running instruction, perform memory-based decryption on the encrypted target file according to the key information corresponding to the encrypted target file, and run the encrypted target file on which the memory-based decryption is performed.

According to the solution in Embodiment 4, when the file is encrypted, the key information corresponding to the encrypted target file is generated, and the key information and the encrypted target file are correspondingly stored, so that when it is required to run the encrypted target file, the user identity is authenticated, and a user that currently logs in or a user that needs to run an encrypted target file in the encrypted target file list is trusted after the authentication succeeds. Therefore, when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby further improving the security of running the encrypted file.

In some embodiments, when the user identity is authenticated, various possible manners are adopted, for example, the identity authentication is performed according to information such as a numeric password, a facial image, fingerprint information, or audio data of a user, and a specific identity authentication manner is not elaborated herein.

In this embodiment and the foregoing embodiments, when the user identity is authenticated, and the encrypted target file is decrypted in the memory, encryption/decryption software or a client that decrypts the encrypted target file may be adopted, and certainly, other possible manners may also be adopted, and a specific implementation manner is not elaborated herein.

As shown in FIG. 4, in this embodiment, the following step is optionally further included:

Step S408: Receive an instruction of closing the encrypted target file after running and clear memory data corresponding to the encrypted target file after running.

Therefore, the encrypted target file that is run before does not leave relevant data information in the memory after the running encrypted target file is closed, so that information data relevant to the encrypted target file cannot be easily obtained by people, which further ensures the security of the encrypted target file.

When the memory data is cleared, various manners are adopted according to different actual application requirements. In one implementation, after the instruction of closing the encrypted target file after running is received, a prompt about whether to clear the memory data is given, and a user selects whether to perform clearing. When it is determined that the clearing needs to be performed, the memory data is cleared based on a clearing instruction given by the user through selecting a corresponding option or button. In another implementation, prompt information is not given, and the memory data is directly and automatically cleared after the instruction of closing the encrypted target file after running is received, so as to enhance the security.

In addition, when the instruction of closing the encrypted target file after running is received, encryption is optionally further performed by directly invoking the key information corresponding to the encrypted target file, so that the encrypted target file after running does not need to be manually encrypted, thereby further improving the efficiency of running the encrypted file.

In addition, in the embodiment shown in FIG. 4, encryption on the file to be encrypted before the identity authentication is taken as an example for illustration. In some embodiments, the file to be encrypted is encrypted after the identity authentication process, and the following takes two examples for specific illustration. In the illustration of the following two specific examples, it is assumed that a file A is a file that is unencrypted and needs to be encrypted, and that the encryption/decryption software is used to perform the user identity authentication and file encryption/decryption is taken as an example for illustration.

Specific Example 1

In the specific example 1, for the file A, in order to encrypt the file A, an adopted encryption manner is as follows:

An identity of a user logging in or running the encryption/decryption software is authenticated, and during specific authentication, the identity authentication may be performed by inputting a password, fingerprint information, a facial image, or audio data of the encryption/decryption software registered by the user, or the like.

After the authentication succeeds, a directory where the file A is located is found through the encryption/decryption software, and the encryption/decryption software is used to encrypt the file A, so as to obtain an encrypted target file A' after the file A is encrypted, and key information a corresponding to the encrypted target file A' is generated. The key information and the encrypted target file A' may be correspondingly stored, and as for a specific storage location, they are locally stored or are stored in a remote server.

After the file A is encrypted, an original file A may be deleted to prevent the unencrypted original file A from being easily obtained by others and thus affecting the security. A process of deleting the original file A may be performed by the encryption/decryption software or may be manually performed by the user, and preferably, it may be performed by the encryption/decryption software, so as to avoid a situation where the user misses deleting the file, and further improve the security.

In a situation where the user has not exited current login state in the encryption/decryption software, when it is required to run the encrypted target file A', the encrypted target file A' may be directly clicked to run, and the encryption/decryption software invokes the key information a corresponding to the file A' after receiving an instruction of clicking to run the encrypted target file A', performs the memory-based decryption on the file A' in the memory by using the key information a, and directly opens or runs the file A on which the memory-based decryption is performed after the memory-based decryption.

In a situation where the user has exited current login state in the encryption/decryption software, when it is required to run the encrypted target file A', the following are included:

The user runs the encryption/decryption software, and the encryption/decryption software performs user identity authentication to implement login of the user.

After the user identity authentication succeeds, the encryption/decryption software obtains an encrypted target file list relevant to the user, where the encrypted target file list includes information of encrypted target files relevant to the user. In a specific implementation, the encrypted target file list represents a relevant encrypted target file through a shortcut icon and so on.

Then, the user selects to run the encrypted target file A', that is, sends an instruction of running the file A' by clicking the file A' in the encrypted target file list or a shortcut icon thereof.

The encryption/decryption software obtains the key information a corresponding to the file A' after receiving the instruction, and performs the memory-based decryption on the file A' in the memory by using the key information a. The file on which the memory-based decryption is performed is directly opened and run.

After the file A is run, the user may perform a relevant operation such as editing processing on the file A. Because the content of the file changes, here, the file on which the editing processing operation is performed is marked as A". After the operation such as editing processing is completed, the user closes the file A"; and after detecting or receiving the closing instruction, the encryption/decryption software encrypts, by using the key information a, the file A" on which the user performs an operation such as editing, stores the encrypted file as the encrypted target file A', and deletes memory data relevant to the file A' in the memory at the same time, so as to ensure that information data relevant to the encrypted target file A' cannot be easily obtained by people, thereby further ensuring the security of the encrypted target file A'.

Specific Example 2

In the specific example 2, for the file A, in order to encrypt the file A, an adopted encryption manner is as follows:

The user directly invokes the encryption/decryption software to encrypt the file A after finding a directory where the file A is located.

After receiving the instruction, the encryption/decryption software performs authentication on an identity of the user logging in or running the encryption/decryption software, and a specific identity authentication manner may be the same as that in the specific example 1.

After the identity authentication succeeds, the encryption/decryption software encrypts the file A, so as to obtain an encrypted target file A' after the file A is encrypted, and key information a corresponding to the encrypted target file A' is generated. The key information and the encrypted target file A' are correspondingly stored, and as for a specific storage location, they are locally stored or are stored in a remote server.

After the file A is encrypted, an original file A is optionally deleted to avoid that the unencrypted original file A is easily obtained by others and thus affecting the security. A process of deleting the original file A may be performed by the encryption/decryption software or may be manually performed by the user, and preferably, it is performed by the encryption/decryption software, so as to avoid a situation where the user misses deleting the file, and further improve the security.

After the file A is encrypted, and when the user needs to run the encrypted target file A', the following are included:

The user runs the encryption/decryption software, and the encryption/decryption software performs user identity authentication to implement login of the user.

After the user identity authentication succeeds, the encryption/decryption software obtains an encrypted target file list relevant to the user, where the encrypted target file list includes information of encrypted target files relevant to the user. In a specific implementation, the encrypted target file list is represented through a shortcut icon and so on.

Then, the user selects to run the encrypted target file A', that is, sends an instruction of running the file A' by clicking the file A' in the encrypted target file list or a shortcut icon thereof.

The encryption/decryption software obtains the key information a corresponding to the file A' after receiving the instruction, and performs the memory-based decryption on the file A' in the memory by using the key information a. The file on which the memory-based decryption is performed is directly opened and run.

After the file A is run, the user may perform a relevant operation such as editing processing on the file A. Because the content of the file changes, here, the file on which the editing processing operation is performed is marked as A''. After the operation such as editing processing is completed, the user closes the file A''; and after detecting or receiving the closing instruction, the encryption/decryption software encrypts, by using the key information a, the file A'' on which the user performs an operation such as editing, stores the encrypted file as the encrypted target file A', and deletes memory data relevant to the file A' in the memory at the same time, so as to ensure that information data relevant to the encrypted target file A' cannot be easily obtained by people, thereby further ensuring the security of the encrypted target file A'.

In this embodiment, other technical features are the same as those in Embodiment 2, which are not elaborated herein.

In addition, according to the solutions in the embodiments of the file encryption and running method of the present invention, when the encrypted target file needs to be opened, the corresponding key information is directly invoked in the memory to perform decryption, and the user does not need to manually input the password of the encrypted target file. For example, when the file is opened through the encryption/decryption software, the user only needs to remember a password of logging in the encryption/decryption software, which avoids a situation where the file cannot be decrypted and run because the password of the encrypted target file is forgotten, thereby not only improving the efficiency of running the encrypted file but also improving the convenience of running the encrypted file.

According to the file encryption and running method of the present invention, the present invention further provides a file encryption and running system. The following illustrates embodiments of the file encryption and running system of the present invention.

Figure 5:
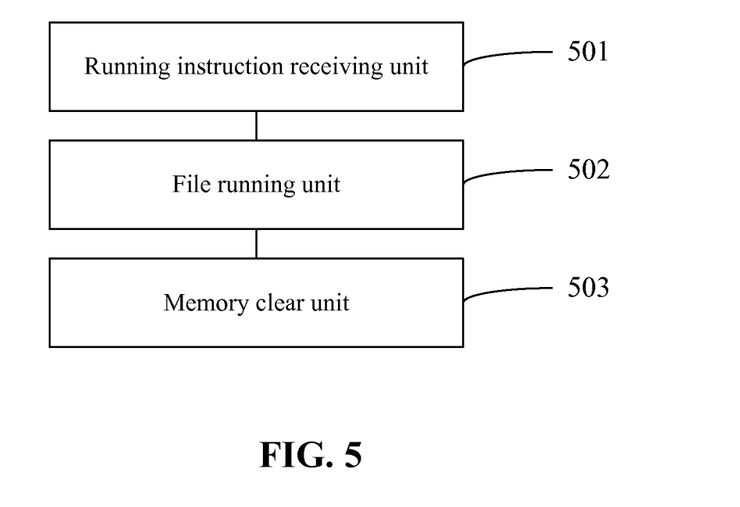
FIG. 5 is a block diagram of Embodiment 1 of a computer system according to some embodiments of the present invention.

FIG. 5 shows a block diagram of Embodiment 1 of a computer system according to some embodiments of the present invention.

As shown in FIG. 5, the file encryption and running system in Embodiment 1 includes: a running instruction receiving unit 501, configured to receive a file running instruction; and a file running unit 502, configured to invoke an encrypted target file according to the running instruction, perform memory-based decryption on the encrypted target file according to key information corresponding to the encrypted target file, and run the encrypted target file on which the memory-based decryption is performed.

According to the solution in this embodiment, when it is required to run the encrypted target file, the key information corresponding to the encrypted target file is obtained, the memory-based decryption is performed on the encrypted target file in a memory by using the key information, and the encrypted target file is directly run after the memory-based decryption is completed. In this file running manner, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby further improving the security of running the encrypted file.

As shown in FIG. 5, the file encryption and running system in this embodiment optionally includes: a memory clear unit 503, configured to clear memory data corresponding to the encrypted target file after running when an instruction of closing the encrypted target file after running is received.

Therefore, the encrypted target file that is run before does not leave relevant data information in the memory after the running encrypted target file is closed, so that information data relevant to the encrypted target file cannot be easily obtained by people, which further ensures the security of the encrypted target file.

When clearing the memory data, the memory clear unit 503, after receiving the instruction of closing the encrypted target file after running, may give a prompt about whether to clear the memory data, and clear the memory data corresponding to the encrypted target file after running when receiving the instruction of clearing the memory data, or may automatically and directly clear the memory data corresponding to the encrypted target file after running when receiving the instruction of closing the encrypted target file after running, so as to enhance the security.

In addition, when receiving the instruction of closing the encrypted target file after running, the memory clear unit 503 may further perform encryption by directly invoking key information corresponding to the encrypted target file, so that the encrypted target file after running does not need to be manually encrypted, thereby further improving the efficiency of running the encrypted file.

Figure 6:
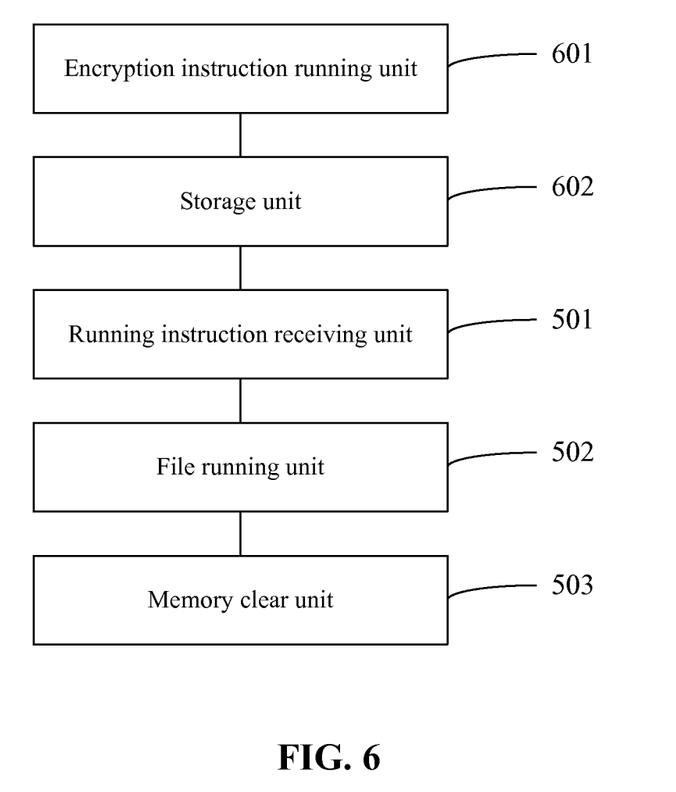
FIG. 6 is a block diagram of Embodiment 2 of a computer system according to some embodiments of the present invention.

FIG. 6 shows a block diagram of Embodiment 2 of a computer system according to some embodiments of the present invention.

As shown in FIG. 6, the difference from Embodiment 1 mainly lies in that the file encryption and running system in Embodiment 2 further includes: an encryption instruction running unit 601, configured to receive a file encryption instruction, encrypt a file to be encrypted to obtain the encrypted target file, and generate the key information corresponding to the encrypted target file; and a storage unit 602, configured to store the key information and the corresponding encrypted target file.

According to the solution in this embodiment, when the file is encrypted, the key information corresponding to the encrypted target file is generated, and the key information and the encrypted target file are correspondingly stored, so that when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be thieved by people, thereby further improving the security of running the encrypted file.

When the key information and the encrypted target file are correspondingly stored, different settings may be made according to different specific requirements.

In some embodiments, the storage unit 602 is set locally, and in this case, the key information and the encrypted target file are stored in the local storage unit 602 at the same time.

In some other embodiments, the storage unit 602 is set in a remote server, and in this case, the key information and the encrypted target file are stored in the storage unit 602 set in the remote server at the same time.

In some further embodiments, the storage unit 602 is set as multiple small storage units. For example, the storage unit 602 is set as two small storage units: a first storage unit (not shown) and a second storage unit (not shown), where the first storage unit is locally set, and the second storage unit is set in a remote server. In this case, one of the key information and the encrypted target file is stored in the first storage unit, and the other is stored in the second storage unit, and different settings may be made according to different specific requirements.

In some further embodiments, in the foregoing first two embodiments, when the key information and the encrypted target file both are locally stored or stored in the remote server, the key information and the encrypted target file are combined into one file and stored, or the key information and the encrypted target file are stored as two separate files, so as to enhance the security, as long as a corresponding key relationship can be obtained based on the corresponding storage relationship to decrypt the encrypted target file, when the encrypted target file needs to be opened.

In addition, after obtaining the encrypted target file, the encryption instruction running unit 601, optionally, further deletes the file to be encrypted. Therefore, an original file (the file to be encrypted) does not leave relevant data information after the encrypted target file is obtained, so that information data relevant to the encrypted target file cannot be easily obtained by people, which further ensures the security of the encrypted target file.

Other technical features of the file encryption and running system in Embodiment 2 are the same as those in the file encryption and running system in Embodiment 1, which are not elaborated herein.

Figure 7:
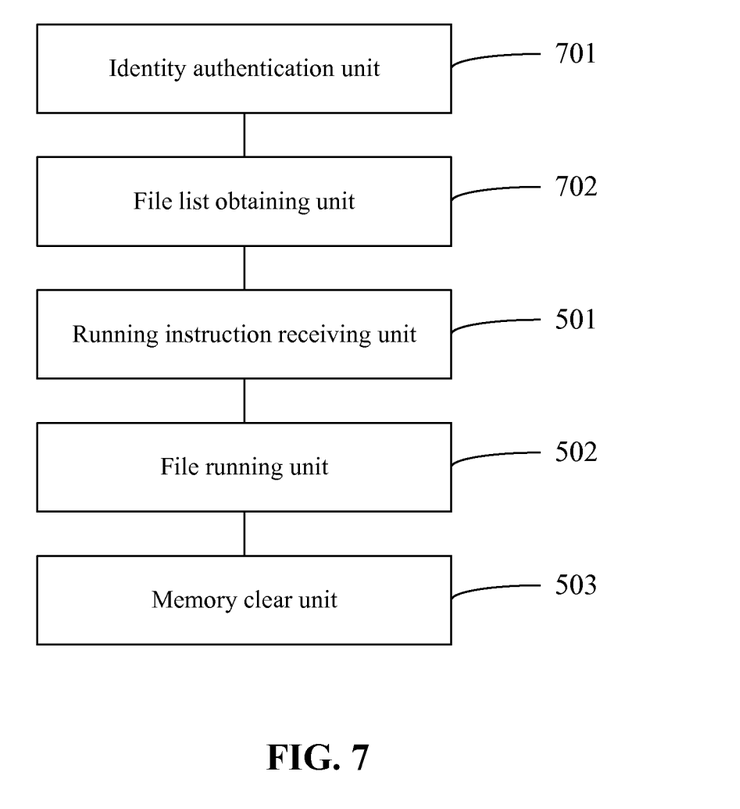
FIG. 7 is a block diagram Embodiment 3 of a computer system according to some embodiments of the present invention.

FIG. 7 shows a block diagram of Embodiment 3 of a file encryption system according to some embodiments of the present invention.

As shown in FIG. 7, the difference from Embodiment 1 mainly lies in that the file encryption and running system in Embodiment 3 further includes: an identity authentication unit 701, configured to receive an identity authentication instruction, and perform authentication on a login identity; and a file list obtaining unit 702, configured to obtain an encrypted target file list corresponding to the authenticated identity after the identity authentication unit 701 succeeds in the authentication.

According to the solution in Embodiment 3, after the user identity authentication succeeds, a user that currently logs in or a user that needs to run an encrypted target file in the encrypted target file list is trusted, so that when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be thieved by people, thereby further improving the security of running the encrypted file.

When the user identity is authenticated, various possible manners may be adopted, for example, the identity authentication is performed according to information such as a numeric password, a facial image, fingerprint information, or audio data of a user, and a specific identity authentication manner is not elaborated herein.

Other technical features of the file encryption and running system in Embodiment 3 are the same as those in the file encryption and running system in Embodiment 1, which are not elaborated herein.

Figure 8:
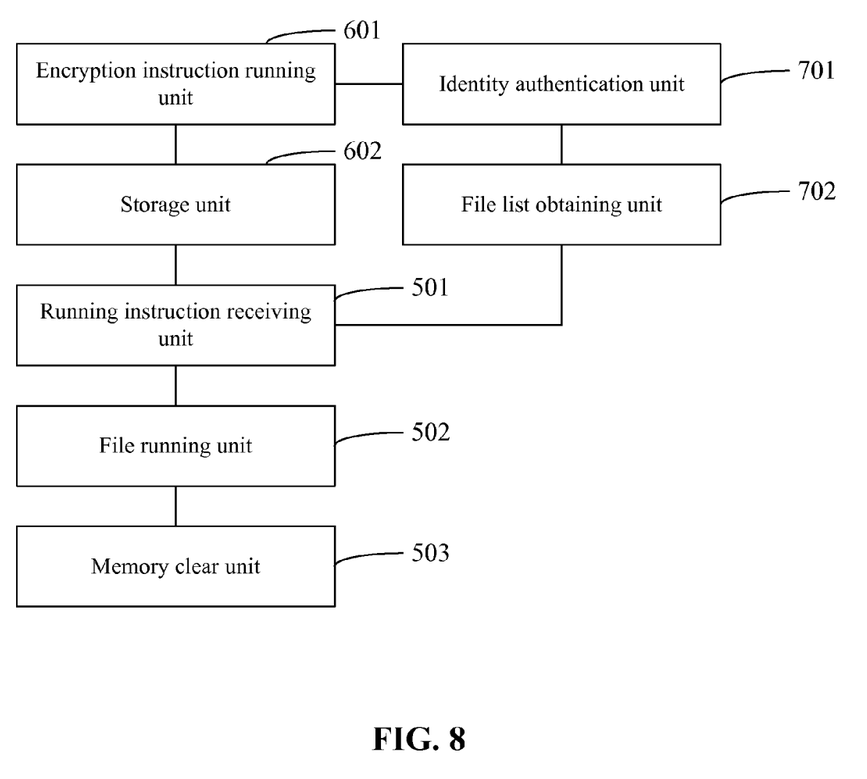
FIG. 8 is a block diagram Embodiment 4 of a computer system according to some embodiments of the present invention.

FIG. 8 shows a block diagram of Embodiment 4 of a computer system according to some embodiments of the present invention.

As shown in FIG. 8, the difference from Embodiment 2 mainly lies in that the file encryption and running system in Embodiment 4 further includes: an identity authentication unit 701, configured to receive an identity authentication instruction, and perform authentication on a login identity; and a file list obtaining unit 702, configured to obtain an encrypted target file list corresponding to the authenticated identity after the identity authentication unit 701 succeeds in the authentication.

According to the solution in Embodiment 4, when the file is encrypted, the key information corresponding to the encrypted target file is generated, and the key information and the encrypted target file are correspondingly stored, so that when it is required to run the encrypted target file, the user identity is authenticated, and a user that currently logs in or a user that needs to run an encrypted target file in the encrypted target file list is trusted after the authentication succeeds. Therefore, when it is required to run the encrypted target file, the corresponding key information thereof is directly obtained, and the encrypted target file is decrypted in a memory by using the key information. Therefore, the file can be opened and run without manually inputting a password of the encrypted target file and manually decrypting the file, thereby improving the efficiency of running the encrypted file. In another aspect, the encrypted target file is decrypted in the memory by using the key information, so that the decrypted file is stored in the memory without generating a permanent file, and therefore, it cannot be stolen by people, thereby further improving the security of running the encrypted file.

When the user identity is authenticated, various possible manners may be adopted. For example, the identity authentication is performed according to information such as a numeric password, a facial image, fingerprint information, or audio data of a user, and a specific identity authentication manner is not elaborated herein.

Other technical features of the file encryption and running system in Embodiment 4 are the same as those in the file encryption and running system in Embodiment 2, which are not elaborated herein.

According to the file encryption and running system in each embodiment of the present invention, a specific file encryption and running manner may be the same as that in the file encryption and running method of the present invention, which is not elaborated herein.

Figure 9:
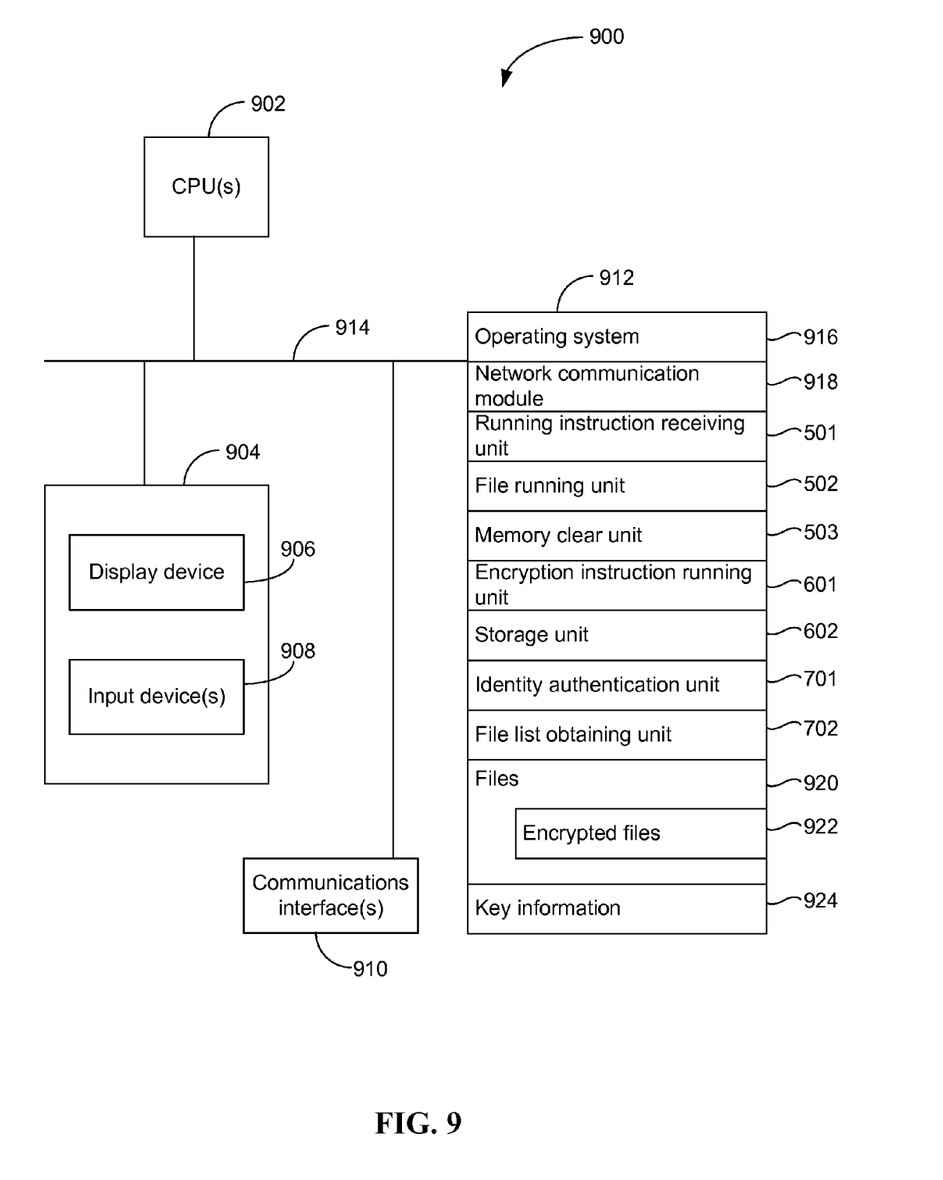
FIG. 9 is a block diagram illustrating a device in accordance with some embodiments of the present invention.

FIG. 9 is a block diagram illustrating a device 900 in accordance with some embodiments of the present invention. The device 900 typically includes one or more processing units (CPU's) 902 for executing modules, programs and/or instructions stored in memory 912 and thereby performing processing operations; one or more network or other communications interfaces 910; memory 912; and one or more communication buses 914 for interconnecting these components. The communication buses 914 optionally include circuitry (sometimes called a chipset) that interconnects and controls communications between system components. The device 900 optionally includes a user interface 904 comprising a display device 906 and one or more input device(s) (e.g., keyboard, mouse, touch-sensitive surface) 908. In some embodiments, an input device 908 is integrated with the display device 906. For example, a touch screen includes a touch-sensitive surface integrated with the display device 906. Memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 912 may optionally include one or more storage devices remotely located from the CPU(s) 902. Memory 912, or alternately the non-volatile memory device(s) within memory 912, comprises a non-transitory computer readable storage medium. In some embodiments, memory 912, or the computer readable storage medium of memory 912 stores the following programs, modules and data structures, or a subset thereof:

an operating system 916 that includes procedures for handling various basic system services and for performing hardware dependent tasks;

a network communication module 918 that is used for connecting the device 900 to other computers via the one or more communication network interfaces 910 (wired or wireless) and one or more communication networks, such as the Internet, other wide area networks, local area networks, metropolitan area networks, and so on;

a running instruction receiving unit 501, configured to receive a file running instruction;

a file running unit 502, configured to invoke an encrypted target file according to the running instruction, perform memory-based decryption on the encrypted target file according to key information corresponding to the encrypted target file, and run the encrypted target file on which the memory-based decryption is performed;

a memory clear unit 503, configured to clear memory data corresponding to the encrypted target file after running when an instruction of closing the encrypted target file after running is received;

an encryption instruction running unit 601, configured to receive a file encryption instruction, encrypt a file to be encrypted to obtain the encrypted target file, and generate the key information corresponding to the encrypted target file;

a storage unit 602, configured to store the key information and the corresponding encrypted target file;

an identity authentication unit 701, configured to receive an identity authentication instruction, and perform authentication on a login identity;

a file list obtaining unit 702, configured to obtain an encrypted target file list corresponding to the authenticated identity after the identity authentication unit 701 succeeds in the authentication;

files 920, among which include encrypted files 922; and key information 924 corresponding to encrypted files 922.

The encryption instruction running unit 602 encrypts a (unencrypted) file 920 to obtain an encrypted file 922 and generate the corresponding key information 924. The file running unit 502 invokes an encrypted file 922 according to a running instruction, performs memory-based decryption on the encrypted file 922 according to key information 924 corresponding to the encrypted file 922, and runs the encrypted file 922 on which the memory-based decryption is performed.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 912 may store a subset of the modules and data structures identified above. Furthermore, memory 912 may store additional modules and data structures not described above.

Although FIG. 9 shows a "device," FIG. 9 is intended more as functional description of the various features which may be present in a set of servers than as a structural schematic of the embodiments described herein. In practice, and as recognized by those of ordinary skill in the art, items shown separately could be combined and some items could be separated.

The foregoing embodiments only show several implementation manners of the present invention and are described in details, but they should not be construed as a limit to the scope of the patent of the present invention. It should be noted that, persons of ordinary skill in the art may make various changes and improvements without departing from the ideas of the present invention, which shall fall within the protection scope of the present invention. Therefore, the protection scope of the patent of the present invention shall be subject to that of the claims.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for running an encrypted file, comprising:
    at a computer having one or more processors and memory for storing programs to be executed by the one or more processors:
        receiving an identity authentication instruction, the identity authentication instruction including a user identifier and a password;
        identifying a set of encrypted target files associated with the user identifier after the identity authentication succeeds, each encrypted target file having corresponding key information that is machine-generated for the user identifier and unknown to any end user;
        receiving a file running instruction associated with one of the encrypted target files;
        invoking the encrypted target file according to the file running instruction, the invoking further including retrieving key information corresponding to the encrypted target file, performing decryption on the encrypted target file in the memory according to the key information, and storing the decrypted target file in the memory;
        running the decrypted target file on which the decryption is performed;
        receiving a file closing instruction associated with the decrypted target file;
        performing encryption on the decrypted target file in the memory according to the key information; and
        deleting the decrypted target file from the memory.

2. The method according to claim 1, before the step of receiving a file running instruction, further comprising:
    receiving a file encryption instruction, encrypting a file to be encrypted to obtain the encrypted target file, generating the key information corresponding to the encrypted target file, and storing the key information and the corresponding encrypted target file.

3. The method according to claim 2, after the step of obtaining the encrypted target file, further comprising: deleting the file to be encrypted.

4. The method according to claim 2, wherein:
    the key information and the encrypted targeted file are locally stored or stored in a server, and the key information and the encrypted target file are combined and stored into a unified file.

5. The method according to claim 2, wherein:
    the key information and the encrypted targeted file are locally stored or stored in a server, and the key information and the encrypted target file are respectively stored as separate files.

6. The method according to claim 2, wherein:
the key information is locally stored and the encrypted targeted file is stored in a server.

7. The method according to claim 2, wherein:
the key information is stored in a server and the encrypted targeted file is locally stored.

8. The method according to claim 1, wherein the identity authentication is performed through one of a numeric password, a facial image, fingerprint information, or audio data of a user.

9. The method according to claim 1, further comprising:
automatically and directly clearing memory data corresponding to the encrypted target file after running when an instruction of closing the encrypted target file after running is received.

10. The method according to claim 9, when the instruction of closing the encrypted target file after running is received, further comprising: invoking the key information to encrypt the encrypted target file after running.

11. The method according to claim 1, further comprising:
when an instruction of closing the encrypted target file after running is received, giving a prompt about whether to clear memory data, and clearing memory data corresponding to the encrypted target file after running when an instruction of clearing the memory data is received.

12. The method according to claim 11, when the instruction of closing the encrypted target file after running is received, further comprising: invoking the key information to encrypt the encrypted target file after running.

13. A computer system for running an encrypted file, comprising:
one or more processors;
memory; and
one or more program units stored in the memory and to be executed by the one or more processors, the one or more program units including:
a running instruction receiving unit, configured to:
receive an identity authentication instruction, the identity authentication instruction including a user identifier and a password,
identify a set of encrypted target files associated with the user identifier after the identity authentication succeeds, each encrypted target file having corresponding key information that is machine-generated for the user identifier and unknown to any end user, and
receive a file running instruction associated with one of the encrypted target files; and
a file running unit, configured to:
invoke the encrypted target file according to the file running instruction, the invoking further including retrieving key information corresponding to the encrypted target file,
perform decryption on the encrypted target file in the memory according to the key information,
store the decrypted target file in the memory,
run the decrypted target file on which the decryption is performed,
receive a file closing instruction associated with the decrypted target file,
perform encryption on the decrypted target file in the memory according to the key information, and
delete the decrypted target file from the memory.

14. The computer system according to claim 13, wherein the one or more program units further include:

an encryption instruction running unit, configured to: receive a file encryption instruction, encrypt a file to be encrypted to obtain the encrypted target file, and generate the key information corresponding to the encrypted target file; and
a storage unit, configured to store the key information and the corresponding encrypted target file.

15. The computer system according to claim 14, wherein:
the encryption instruction running unit is further configured to: after obtaining the encrypted target file, delete the file to be encrypted.

16. The computer system according to claim 14, wherein:
the storage unit comprises a first storage unit set locally and a second storage unit set in a server, and the key information is stored in the first storage unit and the encrypted file information is stored in the second storage unit, or the key information is stored in the second storage unit and the encrypted file information is stored in the first storage unit.

17. The computer system according to claim 14, further comprising:
an identity authentication unit, configured to receive an identity authentication instruction, and perform authentication on a login identity; and
a file list obtaining unit, configured to obtain an encrypted target file list corresponding to the authenticated identity after the identity authentication unit succeeds in the authentication.

18. A non-transitory computer readable storage medium storing one or more programs, the one or more programs comprising instruction which, when executed by a device, cause the device to:
receiving an identity authentication instruction, the identity authentication instruction including a user identifier and a password;
identifying a set of encrypted target files associated with the user identifier after the identity authentication succeeds, each encrypted target file having corresponding key information that is machine-generated for the user identifier and unknown to any end user;
receiving a file running instruction associated with one of the encrypted target files;
invoking the encrypted target file according to the file running instruction, the invoking further including retrieving key information corresponding to the encrypted target file, performing decryption on the encrypted target file in the memory according to the key information, and storing the decrypted target file in the memory;
running the decrypted target file on which the decryption is performed;
receiving a file closing instruction associated with the decrypted target file;
performing encryption on the decrypted target file in the memory according to the key information; and
deleting the decrypted target file from the memory.

19. The non-transitory computer readable storage medium of claim 18, including instructions which cause the device to:
before receiving a file running instruction, receive a file encryption instruction, encrypt a file to be encrypted to obtain the encrypted target file, generate the key information corresponding to the encrypted target file, and store the key information and the corresponding encrypted target file.

* * * * *